US007080080B1

(12) United States Patent
Miller

(10) Patent No.: US 7,080,080 B1
(45) Date of Patent: Jul. 18, 2006

(54) WEB-BASED SIDING MATERIAL MATCHING SYSTEM

(75) Inventor: Chris Robert Miller, Plymouth, IN (US)

(73) Assignee: Miller Claims Consulting, Inc., Plymouth, IN (US)

( * ) Notice: Subject to any disclaimer, the term of this patent is extended or adjusted under 35 U.S.C. 154(b) by 524 days.

(21) Appl. No.: 10/117,384

(22) Filed: Apr. 5, 2002

Related U.S. Application Data

(60) Provisional application No. 60/281,878, filed on Apr. 5, 2001.

(51) Int. Cl.
G06F 17/30 (2006.01)

(52) U.S. Cl. .................... 707/10; 707/104.1; 705/27

(58) Field of Classification Search ............ 707/2, 707/3, 10, 102, 104.1; 709/203, 219; 705/26, 705/27

See application file for complete search history.

(56) References Cited

U.S. PATENT DOCUMENTS

| 4,931,929 | A | | 6/1990 | Sherman |
| 5,291,395 | A | | 3/1994 | Abecassis |
| 5,668,736 | A | * | 9/1997 | Douglas et al. ............... 703/1 |
| 5,970,471 | A | | 10/1999 | Hill |
| 5,986,670 | A | | 11/1999 | Dries et al. |
| 5,999,915 | A | * | 12/1999 | Nahan et al. ................. 705/27 |
| 6,055,516 | A | | 4/2000 | Johnson et al. |
| 6,128,866 | A | * | 10/2000 | Wearne ....................... 52/105 |
| 6,219,653 | B1 | * | 4/2001 | O'Neill et al. .............. 705/400 |
| 6,275,821 | B1 | * | 8/2001 | Danish et al. ................. 707/3 |
| 6,324,522 | B1 | * | 11/2001 | Peterson et al. ............. 705/28 |
| 6,446,053 | B1 | * | 9/2002 | Elliott ......................... 705/400 |
| 2002/0087378 | A1 | * | 7/2002 | Como ........................... 705/8 |

* cited by examiner

*Primary Examiner*—Leslie Wong
(74) *Attorney, Agent, or Firm*—William F. Bahret; P. Derek Pressley

(57) ABSTRACT

A Web-based method for identifying matching or comparable siding materials for use in construction repair, remodeling and the like. The method employs an online computer network such as the Internet to provide access to a database of siding materials organized by siding profile and grain information—including such information not only for currently available products but for discontinued products—from different siding manufacturers. When performing a search for siding matching a given sample, a user accesses the database, selects a desired profile based on visual similarity between the sample and images of siding profiles stored in the database, and then selects a desired grain type based on visual similarity between the sample and images of siding of various grain types for the selected profile. The database preferably also contains a color specimen for each siding profile and grain type for visual comparison of color.

18 Claims, 8 Drawing Sheets

 *Thank you for using SidingMatch.com*
SidingMatch.com
P.O. Box 699
Plymouth, IN 46563
1-888-936-8424
info@sidingmatch.com

March 28, 2002 - 02:26 PM                                    Print This Page

| Type: | Vinyl |
|---|---|
| Profile: | Double 4 inch |
| Thickness: |  |
| Exposed Size: | 8" |
| Projection: | .44" |
| Panel Length: |  |

| Company Name: | Allstate |
|---|---|
| Rep. Name: | John Jackson |
| Claim No.: | 123-123-123 |

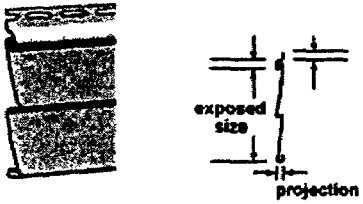

Grain:

| Manufacturer | Description | Product Code | Availability |
|---|---|---|---|
| Alside | Greenbriar double 4" | disc. | Not Available |

Alside
PO Box 2010
Akron, OH 44309
(800) 922-6009       Office
(330) 922-2175       Fax Web Site: www.alside.com
Parent Company: Alside Salvage Companies With Possible Stock:

Contact Person:

Colors:

Glacier White    Antique Parchment    Platinum Grey    Monterey Sand

Comparable Siding Grain:

FIG. 8

WEB-BASED SIDING MATERIAL MATCHING SYSTEM

CROSS-REFERENCE TO RELATED APPLICATION

This application claims the benefit of U.S. Provisional Patent Application Ser. No. 60/281,878, filed Apr. 5, 2001, which provisional application is hereby incorporated by reference.

BACKGROUND OF THE INVENTION

The present invention relates to methods for locating suitable construction materials for repair or remodeling purposes, and more particularly to methods for identifying matching or comparable residential siding, e.g., vinyl and aluminum siding, for repair or remodeling purposes.

Each year more than three billion square feet of vinyl siding are sold in the United States, according to the Vinyl Siding Institute, and most if not all of this material, once installed, bears no specific identification such as manufacturer name, model number, etc., the type of information that would be extremely useful to have in case of a need for replacement such as in the event of storm damage. Unfortunately, due to the lack of such information on the siding itself, insurance adjusters and repair personnel frequently encounter substantial difficulties in locating suitable replacement siding. If no similar siding can be located, a small amount of damage can cause an entire house to be resided.

Exterior siding comes in dozens of profiles, each in a broad array of grain styles. Grain styles are typically unique to the manufacturer and each product series. Finding a matching material for a remodeling or repair project presents an owner, remodeler, or insurance adjuster with a difficult task. For anyone in need of additional siding material, the first step is always to identify the manufacturer of the current product. Up until now, this process has been one of store-to-store material comparison that can take days or even weeks to complete. The problem is compounded if the unidentified siding that is the subject of the search has been discontinued or is otherwise no longer available. There is a need for a substitute for such frustrating and often fruitless research.

SUMMARY OF THE INVENTION

The present invention provides a Web-based method for identifying matching or comparable siding materials for use in construction repair, remodeling and the like. The method employs an online computer network such as the Internet to provide access to a database of siding materials organized by siding profile and grain information—including such information not only for currently available products but for discontinued products—from different siding manufacturers. When performing a search for siding matching a given sample, a user accesses the database, selects a desired profile based on visual similarity between the sample and images of siding profiles stored in the database, and then selects a desired grain type based on visual similarity between the sample and images of siding of various grain types for the selected profile. The database preferably also contains a color image for each siding profile and grain type for visual comparison of color.

According to one embodiment of the invention, a user can visually compare vinyl, aluminum or steel sidings across manufacturing lines and then easily identify a given siding as either currently available or as a discontinued product. Once availability of similar material has been determined, siding selection and purchasing decisions can be completed. Once an available siding has been selected, a Web site will provide the siding manufacturer's contact information, siding specifications, supplier contact phone numbers and web site. If a discontinued siding is selected, the user will be directed to grain patterns similar to the pattern of the discontinued siding. For the insurance industry, knowing that a similar material is currently available is an important consideration in the settlement of a claim involving damaged siding.

These and other objects and advantages of the present invention will be more apparent upon reading the following detailed description in conjunction with the accompanying drawings.

BRIEF DESCRIPTION OF THE DRAWINGS

FIG. 2 is an example of a screen display associated with a home page suitable for use with the present invention.

FIG. 5 is an example of a grain type selection screen suitable for use with the present invention.

FIG. 8 is an example of a screen display showing product specifications and color along with vendor information for a product selected from those displayed in the search results.

DETAILED DESCRIPTION OF PREFERRED EMBODIMENTS

Figure 1:
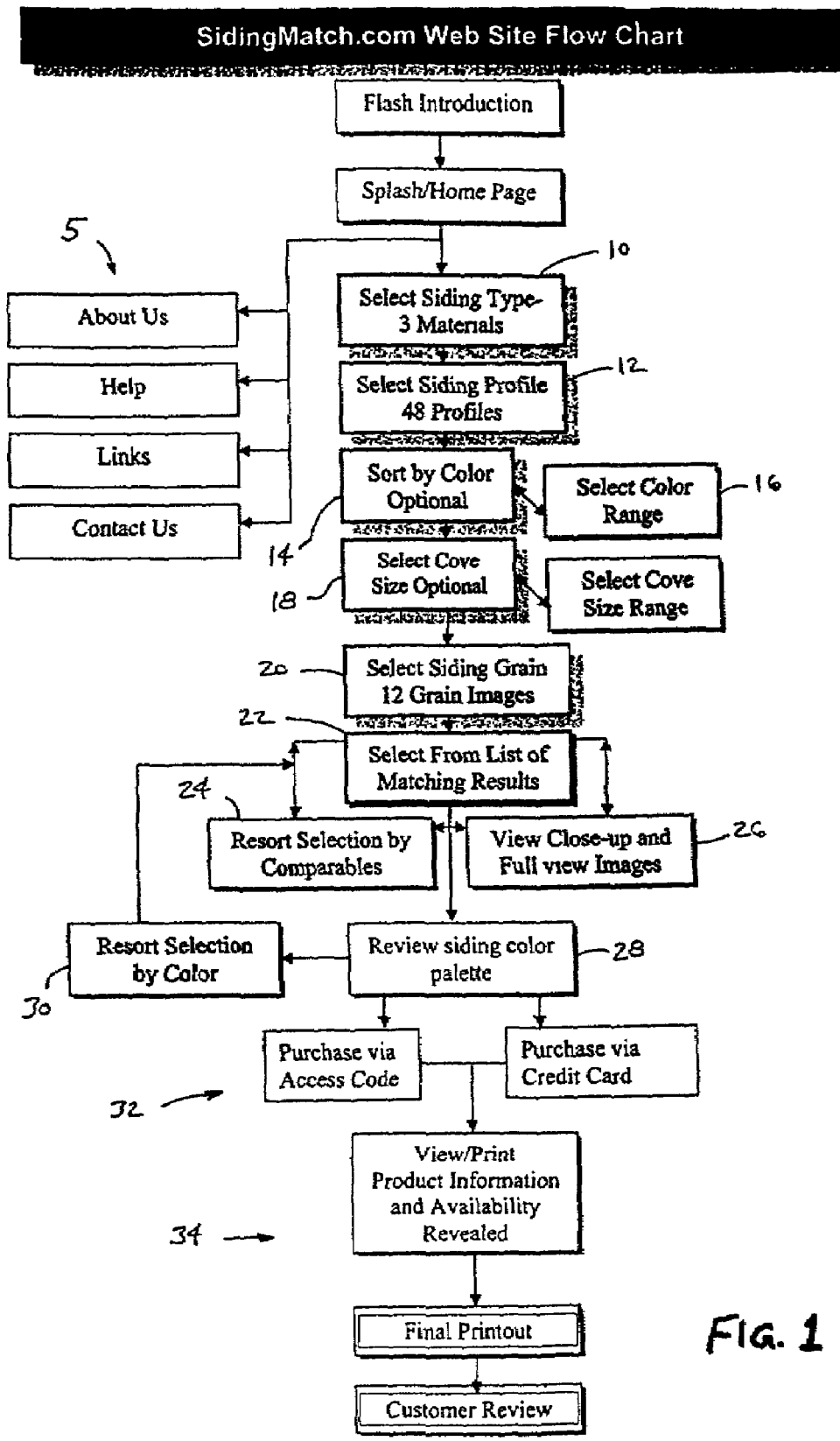
FIG. 1 is a flow chart of the operating program for a Web site according to one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

FIG. 1 is an overall flow chart for an embodiment of the present invention in which visual product identification is accomplished using a database containing siding product information which is accessible via the Internet. It will be understood that the invention is not intended to be limited to the Internet as presently known, and in that regard it should be noted that, unless indicated otherwise, references to a Web-based system or method are intended to comprehend other forms of online computer networks. The database, which may be created using Oracle database language, preferably contains a high-resolution digital photograph and other pertinent information as described herein for every model of siding—including currently available and discontinued siding—from every siding manufacturer or supplier in the United States and Canada.

Figure 2:
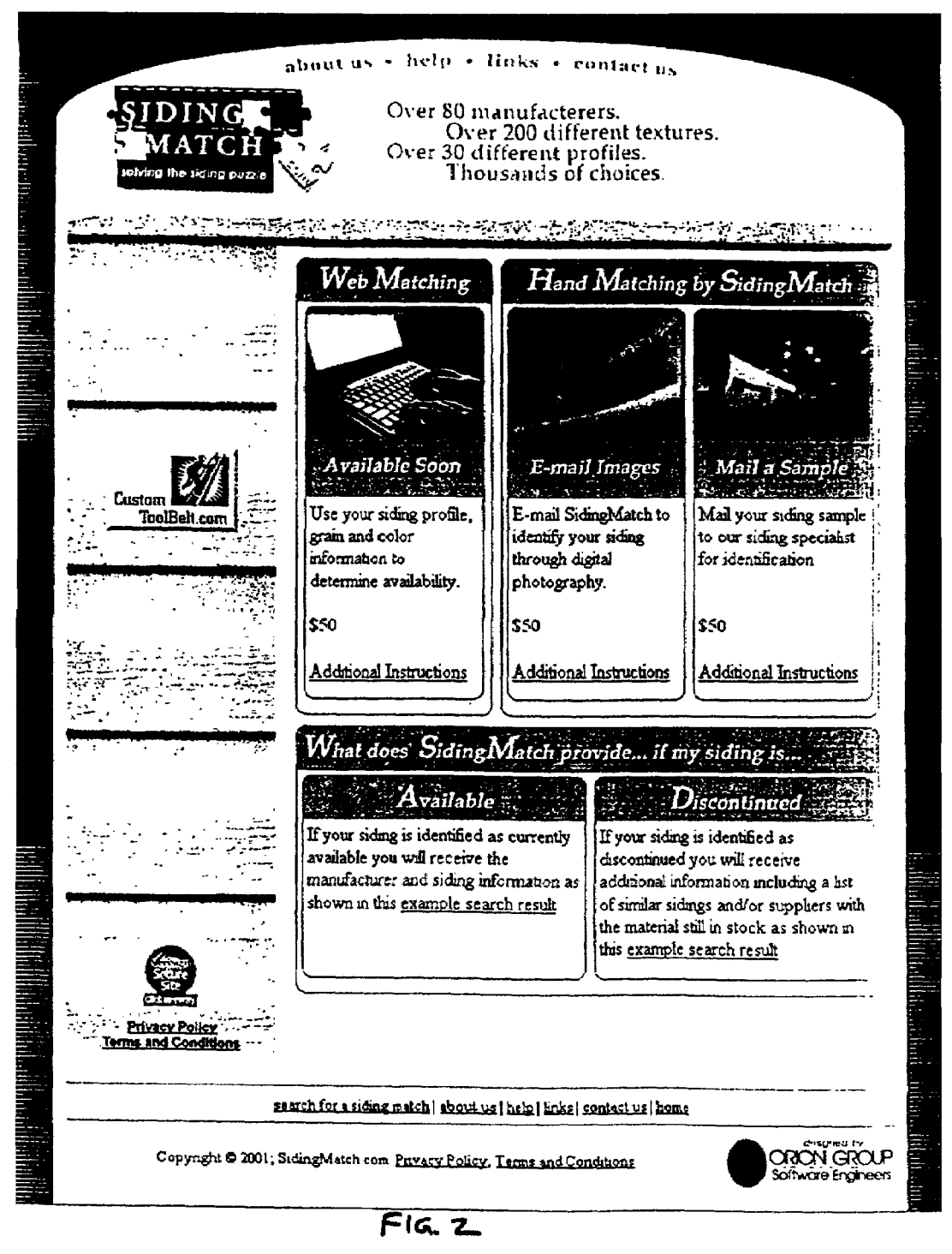

The flow chart depicts the logical arrangement of a Web site, identified by the domain name SidingMatch.com in this example, where the database described herein may be accessed. A computer server (not shown) is programmed to provide all the functionality for the Web site as described herein, using Web Objects language from Apple Computer along with the following software/standards: Flash from Macromedia, Java, JavaScript, and HTML. The Web site is provided with a graphical user interface (GUI) including a home page in a conventional manner, and the home page may include conventional menu items such as those identified by reference numeral 5 by which the user may connect to other pages on the Web site in a known manner such as by clicking a mouse after moving the cursor to a desired icon on the screen. Such menu items as well as other possible user selections are shown in FIG. 2 as one example of a screen display associated with a home page suitable for use with the present invention.

Figure 3:
FIG. 3 is an example of a siding type selection screen suitable for use with the present invention.

Block 10 in the flow chart of FIG. 1 is a step in the Web site control program in which the user is shown a set of siding materials, e.g., vinyl, aluminum and steel, and prompted to select a siding type of interest. An example screen for this step of the process is shown in FIG. 3. The user may have a physical sample or a photograph of siding to be replaced, and at this step of the process selects the material type corresponding to the sample. The control program for the Web site preferably enables such selection and all other user selections to be made by mouse action as indicated above.

Figure 4:
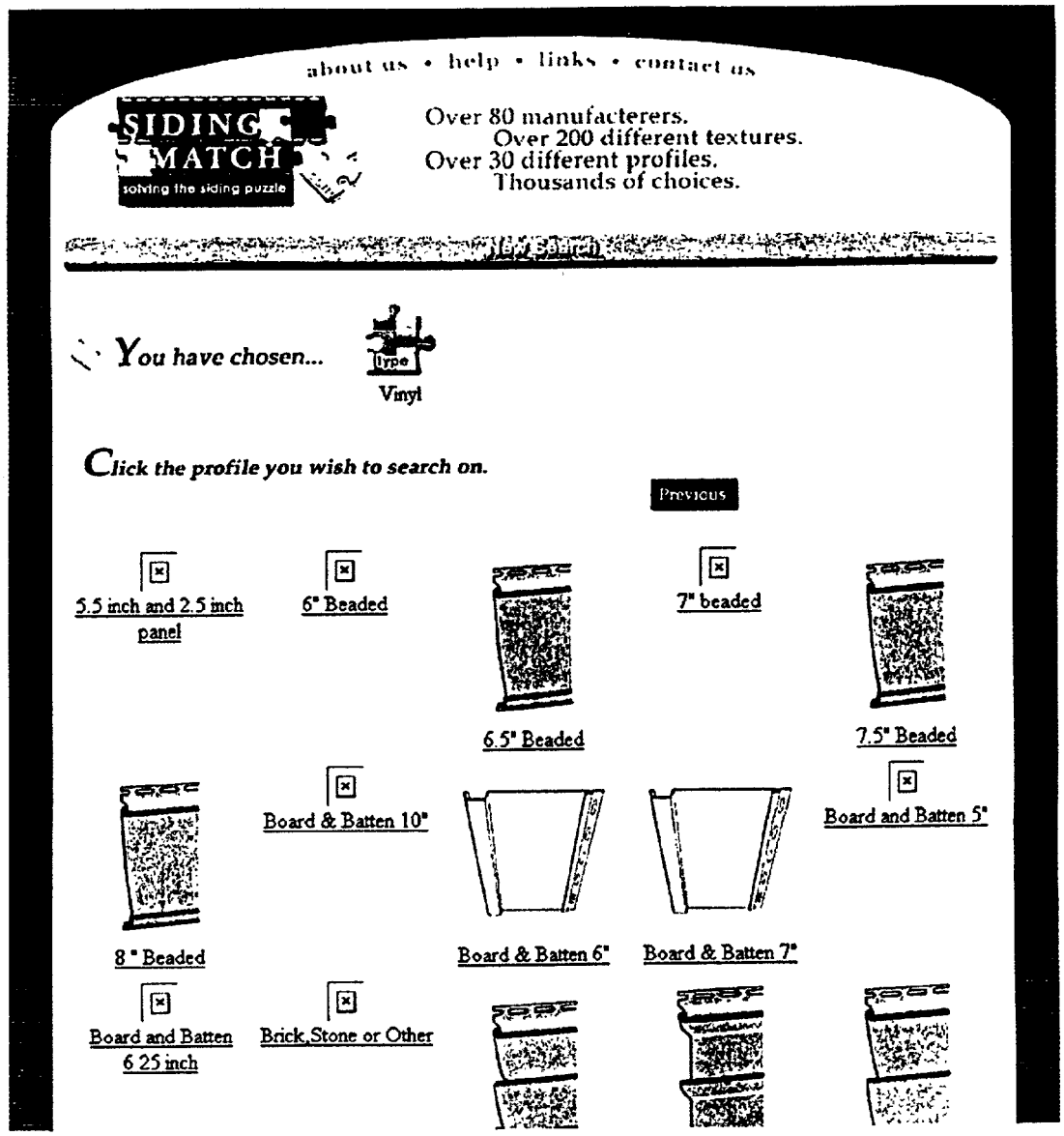
FIG. 4 is an example of a profile selection screen suitable for use with the present invention.

The server is further programmed to prompt the user at step 12 to select a siding profile from among, for example, 48 different profiles. This step of the process is further illustrated by the sample screen of FIG. 4, which shows a number of different sizes and profiles for the selected material type, which in this example is vinyl. It will be understood that an "x" in a box in the drawing represents an image not shown but that the image for all beaded profiles is the same as those shown, and likewise that the image for all board and batten profiles is the same as those shown. The database preferably contains such information for every model of siding, whether currently available or discontinued.

Step 14 is an optional step mainly applicable in cases where the color of the siding sample to be identified is not a common color and where the user may therefore expect a relatively small number of associated siding products. The Web site software includes a provision for a set of color rainbows to be presented on screen in step 16, each rainbow including the colors in a different portion of the color spectrum, whereby the user's selection of siding products may be narrowed to those in a desired color range. Seven color ranges and corresponding rainbows are presently preferred. If the user elects the color sort of step 14, this narrowing process is performed without regard to grain type.

In step 18 of the control program, the user is presented with the option of selecting a cove size, a dimension applicable to a particular siding profile known as Dutch Lap. The cove sizes are preferably grouped into ranges corresponding to the height of the cove or groove in the siding.

Figure 5:
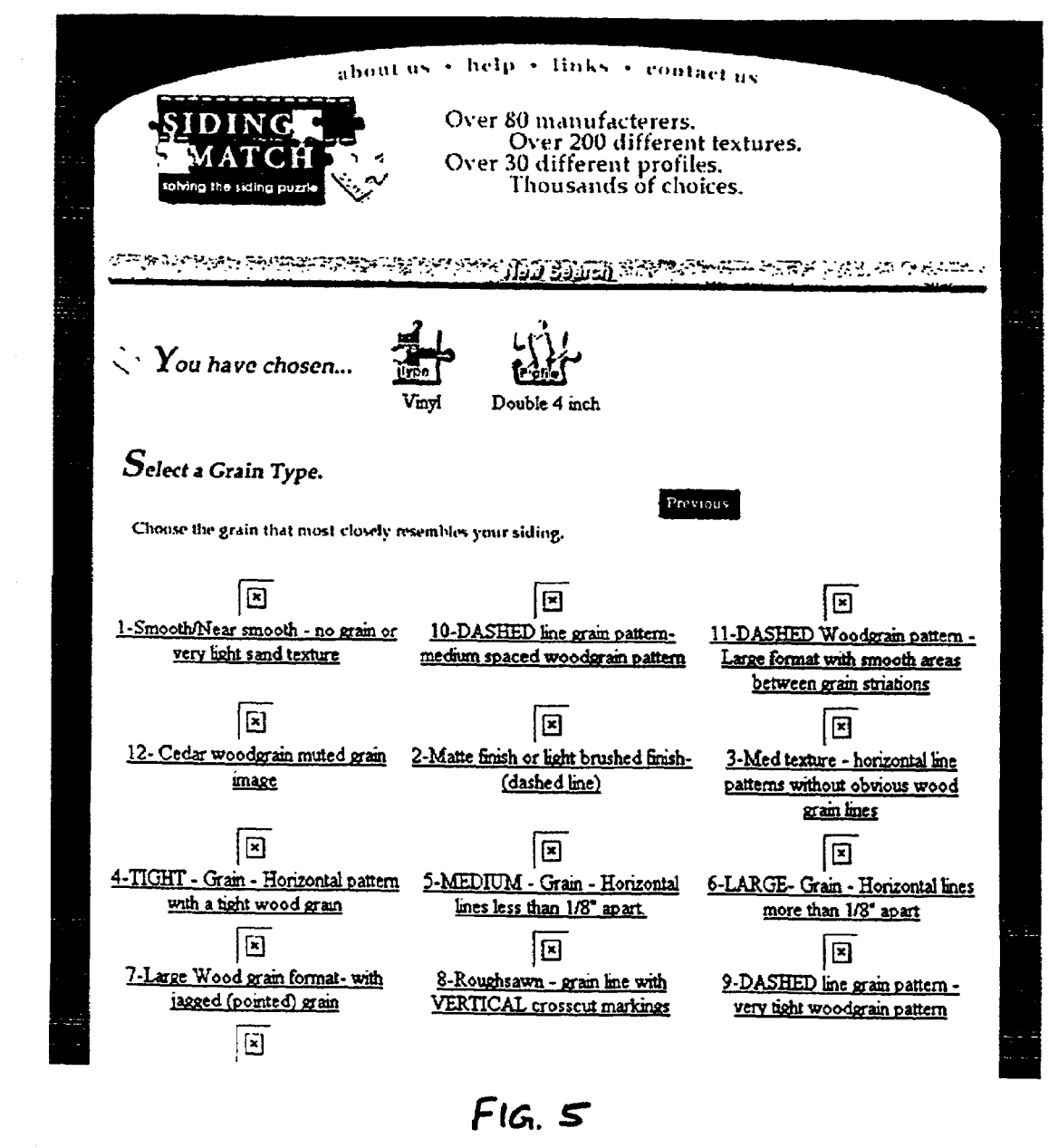
Figure 6:
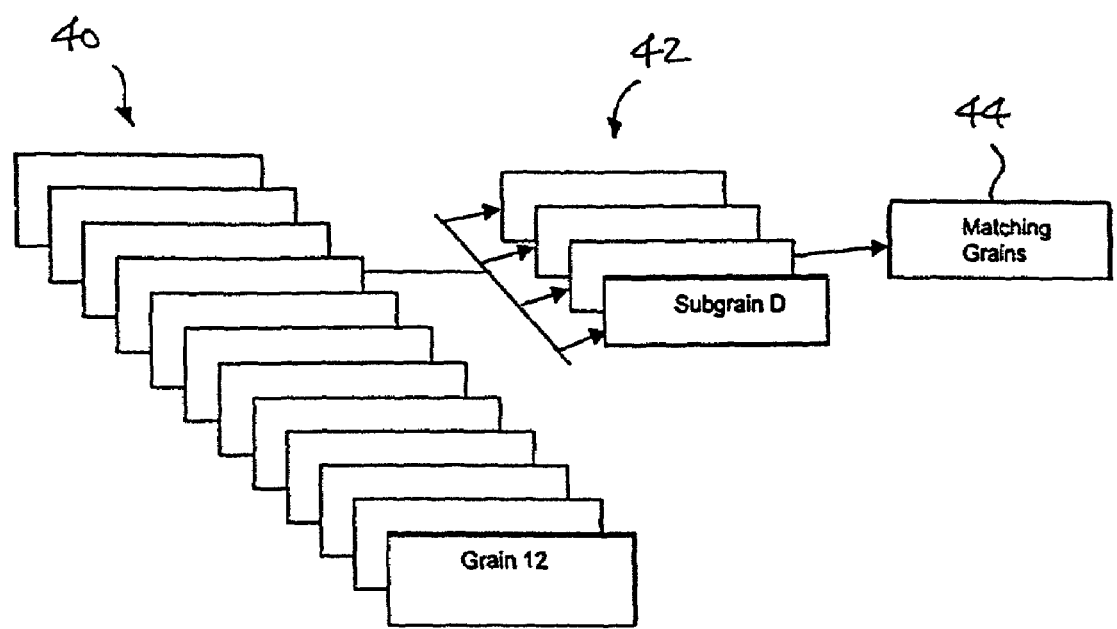
FIG. 6 illustrates the categorization of grain types and subsets thereof according to one embodiment of the present invention.

The next step of the process is step 20, in which, as illustrated by the example screen of FIG. 5, the control program prompts the user to select a grain type for the siding sample in question. Referring to FIG. 6, all available and discontinued siding materials are preferably divided into groups 40 by grain type, e.g., 12 generic grain types as shown in the drawing. Although not shown in FIG. 5, a high quality black-and-white image is preferably displayed for each grain type for comparison with the siding sample. FIG. 6 shows two examples of such an image for the grain type designated by the number 1 ("smooth/near smooth") in FIG. 5. Each grain type is divided in 3 to 5 subsets of similar grains, as indicated by reference numeral 42 in FIG. 6, and within each subset all matches (pairs or more) that are close enough to be considered visually equal are listed as equals or matching grains 44 for the user's information in case the user's selection is identified as discontinued.

Figure 7:
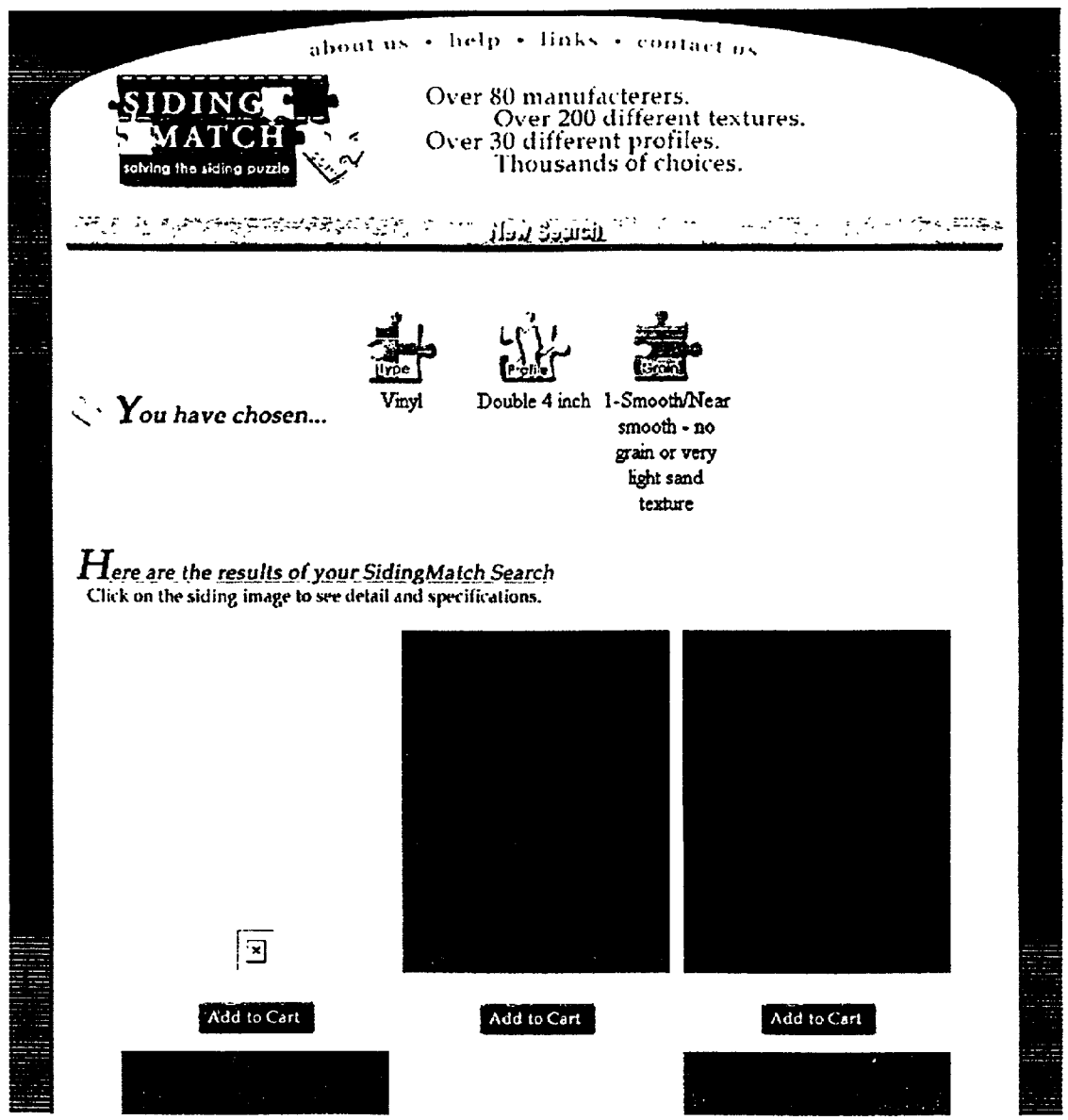
FIG. 7 is an example of a screen display showing search results under certain criteria according to the flow chart of FIG. 1.

In step 22, illustrated by FIG. 7, the search results under the above-described criteria are displayed and the user is prompted to select an image from among the displayed results, whereupon the system displays product specifications and colors along with vendor information as indicated in FIG. 8. The following information is collected for each siding material in the database according to one embodiment of the present invention:

System-specific product number

Manufacturer's name and product number, and contact information

Text description of product series and size

Availability (available or discontinued)

If discontinued, date discontinued and salver information

Material type vinyl, steel or aluminum

System-specific grain number, grain number subset and matching grain number sub-subset Profile description (double 4" Single 8" Triple 3" etc.)

Panel height, length and projection

Comments on unique features (text)

The user is given the option at this point to resort the selections by comparables (step 24), i.e., to limit the search results to siding that has been categorized in the database as comparable to the currently displayed selection. The user may switch between close-up and full-view images of the selected product, in step 26. The full view suitably shows an approximately 8" sample of each siding material with a ruler in the view for scale, and a suitable close-up is a 4× close-up of the above image with a ruler scale. The database may also include an actual-size image approximately 2.5"×3" for each siding sample.

The currently available and discontinued colors for the selected siding are displayed on the screen for review (step 28) as illustrated in FIG. 8, thereby allowing and the system is programmed to allow the user to limit the results to a selected color at this point in the process (step 30). This step of the process may include the same type of color rainbows as described above to facilitate limiting the number of selections by color range as opposed to individual colors.

Each siding material in the database has an associated color number and percent tint. The color number may be established automatically using a Pantone Color Cue color meter, a handheld spectro-colorimeter preprogrammed with Pantone Matching System Color data. Once the color number is selected for a particular product to be included in the database, the correct tint for the product is determined manually, by visual inspection with the aid of Pantone color tints, which are commercially available in the form of printed color strips or cards each having nine tints per color, from 10% to 80%. The process of obtaining the color number and tint percentage for each product to be included in the database is preferably performed under daylight conditions. This information is then translated, in ADOBE Illustrator for example, to a set of corresponding HTML and RGB color values, examples of which are provided in the following table:

| Color | Pantone | tint | HTML | R | G | B |
| --- | --- | --- | --- | --- | --- | --- |
| White | 4545 | 10% | FDFCF7 | 253 | 252 | 247 |
| Antique Ivory | 7499 | 70% | FFF6E0 | 255 | 246 | 224 |
| Irish Linen | 4525 | 20% | F6F2E1 | 246 | 242 | 225 |
| Clipper Grey | 415 | 40% | D5D5CB | 213 | 213 | 203 |
| Sierra | 4505 | 50% | D0C17B | 208 | 193 | 123 |
| Country Almond | 145 | 20% | EDDAB6 | 237 | 218 | 182 |
| Estate Grey | 418 | 60% | 898B72 | 137 | 139 | 114 |
| Terra Clay | 147 | 60% | A88D3E | 168 | 141 | 62 |
| Autumn Ash | 7504 | 60% | D89F4B | 216 | 159 | 75 |
| Sage | 5743 | 70% | 54622D | 84 | 98 | 45 |
| Desert | 457 | 20% | F1E9BE | 241 | 233 | 190 |
| Storm | 7533 | 80% | 6C6C6C | 108 | 108 | 108 |
| Horizon Blue | 2965 | 40% | 7289A1 | 114 | 137 | 161 |

The HTML color code is used to display the color on the Web, and is most useful in conjunction with computer monitors which display true color. It is contemplated that the user's computer is provided, if necessary, with color correction software enabling the monitor to accurately display the color. In cases where a user computer is not so equipped, the color as displayed on the user's screen is useful for preliminary identification purposes, and the color identification may be completed with the aid of a color chip corresponding to the color selected on the Web site, such color chip being ordered by the user from the Web site owner or an agent or distributor thereof. Alternatively in such cases, the Web site may specify a corresponding color on a widely available color chart, such as a Sherwin Williams color ring, which the user may then use for a final visual color comparison.

Similar siding colors are grouped together, in seven color ranges as alluded to above, and in each group the products with the same Pantone color value and tint percentage are considered the same in color, i.e., an exact color match. This allows the user to find similar as well as exact color matches of the siding in its present condition as compared to the color of the siding when it was new.

As shown in FIG. 1, the system preferably also includes methods 32 for making payments, such as by credit card or by access code, e.g., for a corporate account, as well as closing steps 34 for viewing and printing product information.

While the invention has been illustrated and described in detail in the drawings and foregoing description, the same is to be considered as illustrative and not restrictive in character, it being understood that only preferred embodiments has been shown and described and that all changes and modifications that come within the spirit of the invention are desired to be protected.

What is claimed is:

1. A Web-based method of identifying matching or comparable siding material for a building, comprising:
   accessing an online computer network server containing a database of siding materials organized by surface profile and grain information for a plurality of siding material products, including currently available and discontinued products, from different siding manufacturers;
   comparing a given sample of siding to surface profiles in said database for different siding material products from different manufacturers;
   selecting a desired surface profile based on visual similarity to said siding sample;
   comparing said siding sample to the grain types for said selected surface profile in said database; and
   selecting a desired grain type based on visual similarity to said siding sample.

2. The method of claim 1, wherein said database includes a color specimen for each siding material product in said database, further comprising:
   comparing said siding sample to the color specimen for said selected surface profile and grain type in said database.

3. A Web-based method of facilitating identification of matching or comparable siding material for a building, comprising:
   providing online access to a computer network server containing a database of siding materials organized by surface profile and grain information for a plurality of siding material products, including currently available and discontinued products, from different siding manufacturers;
   prompting an online user to select a desired siding surface profile in said database; and
   prompting said user to select a desired grain type for said selected surface profile in said database.

4. The method of claim 3, wherein said database includes a color specimen for each siding material product in said database, further comprising:
   displaying a set of colors for said selected surface profile and grain type in said database; and
   responding to user selection of a color by displaying the color specimen corresponding to the selected color and to said selected surface profile and grain type for comparison with a siding sample.

5. A Web-based method of facilitating identification of matching or comparable siding material for a building, comprising:
   creating a database of images of siding materials organized by surface profile and grain information for a plurality of siding material products, including currently available and discontinued products, from different siding manufacturers;
   providing online access to said database from a remote user computer;
   displaying images of a plurality of siding surface profiles in said database simultaneously on the screen of said remote user computer for comparison with a siding sample obtained from said building;
   prompting a user of said remote computer to select a desired siding surface profile in said database from said siding surface profile images displayed simultaneously on the screen of said remote user computer;
   displaying images of a plurality of siding grain types in said database simultaneously on the screen of said remote user computer for comparison with said siding sample from said building;
   prompting said user to select a desired grain type in said database from said siding grain images displayed simultaneously on the screen of said remote user computer;
   displaying images of a plurality of siding material products substantially matching the siding surface profile and siding grain type selected by said user.

6. The method of claim 5, wherein said user is first prompted to select a desired siding surface profile and then prompted to select a desired grain type from among the siding grain images in the database for the selected siding profile.

7. The method of claim 5, wherein said siding sample from said building is a physical sample.

8. The method of claim 5, wherein said siding sample from said building is a photographic image.

9. The method of claim 5, wherein said database includes a subset of similar grains for each of said siding grain types, and includes for each subset an indication of the grains that are close enough in appearance to be considered matching grains.

10. The method of claim 5, wherein said database includes a color specimen for each siding material product in said database, further comprising:
   displaying a set of colors for said selected surface profile and grain type in said database; and
   responding to user selection of a color by displaying the color specimen corresponding to the selected color and to said selected surface profile and grain type for comparison with said siding sample.

11. A Web-based method of facilitating identification of matching or comparable siding material for a building, comprising:
   providing online access to a computer network server containing a database of images of siding materials organized by surface profile and grain information for a plurality of siding material products, including currently available and discontinued products, from different siding manufacturers;
   prompting an online user to select a desired siding surface profile in said database by visual comparison of siding surface profile images to a given siding sample; and
   prompting said user to select a desired grain type for said selected siding surface profile in said database by visual comparison of siding grain type images to said siding sample.

12. The method of claim 11, wherein said database includes a color specimen for each siding material product in said database, further comprising:
   displaying a set of colors for said selected siding surface profile and grain type in said database; and
   responding to user selection of a color by displaying the color specimen corresponding to the selected color and to said selected siding surface profile and grain type for comparison with said siding sample.

13. A Web-based method of facilitating identification of matching or comparable siding material for a building, comprising:
   creating a database of images of siding materials organized by surface profile and grain information for a plurality of siding material products, including currently available and discontinued products, from different siding manufacturers;
   providing online access to said database from a remote user computer;
   displaying images of a plurality of siding surface profiles in said database simultaneously on the screen of said remote user computer for visual comparison with a siding sample obtained from said building;
   prompting a user of said remote computer to select a desired siding surface profile in said database from said siding surface profile images displayed simultaneously on the screen of said remote user computer;
   displaying images of a plurality of siding grain types in said database simultaneously on the screen of said remote user computer for visual comparison with said siding sample from said building;
   prompting said user to select a desired grain type in said database from said siding grain images displayed simultaneously on the screen of said remote user computer; and
   displaying images of a plurality of siding material products from different siding manufacturers substantially matching the siding surface profile and siding grain type selected by said user.

14. The method of claim 13, wherein said user is first prompted to select a desired siding surface profile and then prompted to select a desired grain type from among the siding grain images in the database for the selected siding surface profile.

15. The method of claim 13, wherein said siding sample from said building is a physical sample.

16. The method of claim 13, wherein said siding sample from said building is a photographic image.

17. The method of claim 13, wherein said database includes a subset of similar grains for each of said siding grain types, and includes for each subset an indication of the grains that are close enough in appearance to be considered matching grains.

18. The method of claim 13, wherein said database includes a color specimen for each siding material product in said database, further comprising:
   displaying a set of colors for said selected surface profile and grain type in said database; and
   responding to user selection of a color by displaying the color specimen corresponding to the selected color and to said selected surface profile and grain type for comparison with said siding sample.

* * * * *